United States Patent [19]

Wilson, Sr. et al.

[11] 4,312,842
[45] Jan. 26, 1982

[54] PROCESS OF MANUFACTURE OF PHOSPHORIC ACID WITH RECOVERY OF CO-PRODUCTS

[76] Inventors: Eddie K. Wilson, Sr., 5877 Essex Ct., Apt. 2; Silvio J. Spigolon, 7155 Riverdale Cove, both of Memphis, Tenn. 38138

[21] Appl. No.: 120,825

[22] Filed: Feb. 12, 1980

[51] Int. Cl.³ .......................... C01F 1/00; C01F 5/10; C01B 25/16
[52] U.S. Cl. .................................. 423/178; 423/320; 423/522; 423/541 R; 423/483; 423/322
[58] Field of Search .............. 423/317, 319, 320, 331, 423/522, 541, 322, 323, 483, 484, 555, 178; 106/109, 110

[56] References Cited

U.S. PATENT DOCUMENTS

| | | | |
|---|---|---|---|
| 2,528,103 | 10/1950 | Willson | 423/522 |
| 2,687,946 | 8/1954 | Manning et al. | 23/177 |
| 2,687,947 | 8/1954 | Manning et al. | 423/177 |
| 3,087,790 | 4/1963 | Wheelock et al. | 23/186 |
| 3,203,681 | 8/1965 | Rosa et al. | 263/21 |
| 3,260,035 | 7/1966 | Wheelock et al. | 55/73 |
| 3,326,633 | 6/1967 | Carothers et al. | 423/172 |
| 3,547,581 | 12/1970 | Gauster et al. | 423/555 |
| 3,607,036 | 9/1971 | Foecking et al. | 23/177 |
| 3,607,045 | 9/1971 | Wheelock et al. | 23/186 |
| 4,059,674 | 11/1977 | Lopker | 423/167 |
| 4,120,989 | 7/1978 | Wheelock | 423/541 |

OTHER PUBLICATIONS

"Sulfuric Acid from Anhydride", I & EC, vol. 49, No. 8, Aug. 1957.
"Manufacture of Cement from Industrial Byproducts," Chemistry and Industry, Feb. 1971.
'Production of Sulphuric Acid and Cement from Phosphogypsum Using the SJ Process', Chemical Age of India, vol. 27, 1976.
"The Simultaneous Production of Yellow Phosphorus and Alumina Cement," Chemical Abstracts, 1964.
Getting Rid of Phosphogypsum-II, Phosphorus and Potassium, No. 89, May/Jun. 1977.

*Primary Examiner*—O. R. Vertiz
*Assistant Examiner*—Gregory A. Heller
*Attorney, Agent, or Firm*—Gravely, Lieder & Woodruff

[57] ABSTRACT

An improved process for the wet-acid process for manufacture of phosphoric acid with recovery of valuable co-products is provided. Phosphate rock is digested in a sulfuric acid/phosphoric acid mixture. Phosphoric acid is filtered from the digested rock, the gypsum thus formed, and sludge from the phosphoric acid, are second-stage acid treated, washed, and heated in a drier-calciner at 900° to 1300° C. Sulfur dioxide evolved from the gypsum and the fossil fuel is used to replenish the sulfuric acid. The hot impure lime remaining is fused in an electric furnace to form valuable calcium aluminum silicate products, which are then tapped, cooled, stored, and sold. The only waste products from the process are common, sulfur dioxide free combustion gases from the high sulfur content fossil fuel. Nearly 100% recovery of all phosphorus and fluorine values is claimed.

8 Claims, 1 Drawing Figure

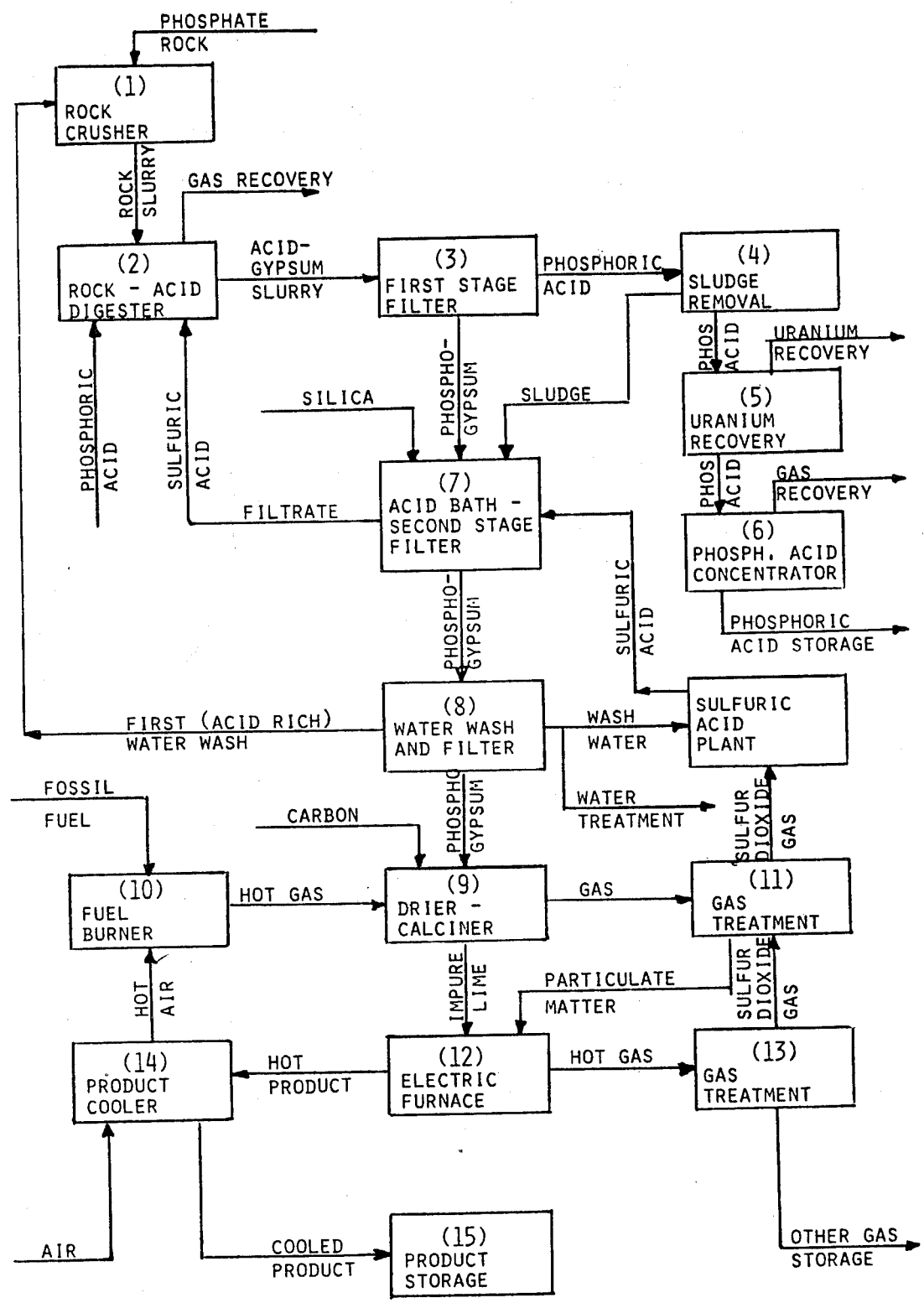

PROCESS OF MANUFACTURE OF PHOSPHORIC ACID WITH RECOVERY OF CO-PRODUCTS

BACKGROUND OF THE INVENTION

1. Field of the Invention

Natural phosphate rock, or fluorapatite, is the primary source of phosphorus for practically all phosphatic chemicals. Two processes are in common use around the world to produce phosphorus, (1) the electric furnace process, and (2) the acid, or wet, process.

In the electric furnace, the phosphate rock is melted and the phosphorus vapors are condensed as elemental phosphorus. By-products consist of calcium silicate slag, carbon monoxide, carbon dioxide and ferrosilicon, all of which have only some commercial value at present.

The acid process uses a strong mineral acid, usually sulfuric acid, to digest the rock, releasing phosphoric acid and leaving a residue of calcium sulfate, or gypsum, and small quantities of phosphorus, fluorine and various trace elements. This by-product, at present, has no commercial value and, in fact, poses an environmental problem because of the contamination of rainwater runoff from soluble compounds in the gypsum.

This invention is a process whereby all of the solid and liquid residue from the phosphoric acid manufacture is recovered as a commercially valuable product, with the option of using high sulfur low cost fuels, which cannot be used economically elsewhere, and leaving only normal and sulfur-free combustion gases as a residue. This process incorporates mostly existing equipment in a novel and unique sequence which will significantly improve the technology of phosphoric acid manufacture and process economics, eliminate an environmentally repugnant and unacceptable residue, and produce useful and much needed coproducts.

The sulfur values in the calcium sulfate and in the fuel are recovered and regenerated into the sulfuric acid used to digest the phosphate rock. The calcium sulfate after de-sulfurization is an impure lime. Some fluorine and phosphorous are recovered at a low temperature acid and water treatment of the gypsum, and most of the remaining fluorine and phosphorus, with other trace elements, are removed and recovered at high temperature in an electric furnace. The molten impure lime in the furnace is tapped, cooled, and sold as a calcium silicate material or for use in manufacturing refractory or rock wool insulation materials.

2. Description of Prior Art

The invention described below is an improvement of the conventional acid, or wet, process for phosphoric acid manufacture. As such, the improved process herein incorporates existing equipment with new technology in a novel and unique sequence and manner. The conventional wet, or acid, process for phosphoric acid produces a residue of impure calcium sulfate di-hydrate, or waste phospho-gypsum. It requires the burning of new, elemental sulfur to ultimately produce sulfuric acid in a conventional sulfuric acid contact or chamber process plant or the obtaining of fresh sulfuric acid from an off site source. The acid digests the calcium phosphate rock; the sulfur trioxide combines with calcium oxide to form a calcium sulfate, which is then discarded as having no commercial value. In fact, drainage from rainwater entering the waste stockpiles produces an acid effluent which is environmentally unsafe, and must be treated before release. Therefore this economical and technically feasible process for elimination of the waste products serves many useful purposes.

The process for manufacture of phosphoric acid from phosphate rock and sulfuric acid (wet process) is over 80 years old in essentially its present form. A complete description is generally available in textbooks and trade documents. Essentially, the process follows these steps:

(1) Calcium phosphate rock, or fluorapatite, is mined, beneficiated by washing and sintering, and shipped to the phosphoric acid plant.

(2) The phosphate rock is ground to a fine powder in a dilute solution of phosphoric acid. The slurry is passed into digester tanks where it is reacted with 55% sulfuric acid, diluted with phosphoric acid. Water vapor, carbon dioxide, and fluorine compounds are evolved as gases; the fluorine values are recovered by absorption.

(3) Acid digestion of the slurry requires 4 to 8 hours at 75° to 80° C. for the usual di-hydrate process, or at a slightly higher temperature for the hemi-hydrate (HDH) process. The objective is to form easily-filtered and easily washed crystals of the di-hydrate or hemi-hydrate form of calcium sulfate. The calcium in the phosphate rock reacts with sulfate from the sulfuric acid to form the calcium sulfate. The hydrogen ions from the sulfuric acid combine with phosphorus to form phosphoric acid and with fluorine to form hydrogen fluoride.

(4) The acid-gypsum slurry from the digester tanks is taken to acid recovery, usually some form of a vacuum filter. The phosphoric acid is removed leaving a gypsum cake, in which the solids are calcium sulfate di-hydrate or hemi-hydrate with about 5 to 10% impurities, mostly iron oxide, alumina, and silica, derived from the parent rocks.

(5) The phosphoric acid filtrate is taken to an evaporator, or concentrator, where it is evaporated to the desired concentration. Fluorine and phosphorus values are recovered from the evaporated fumes.

(6) The impure gypsum crystals are washed with water and filtered. The first filter waters are returned to the digester tanks and later, more diluted water is taken to a wastewater treatment plant where the acidity is neutralized. The washed cake is slurried with wastewater and sent to a settling basin; the water is returned to the process and the settled phospo-gypsum is taken to a stockpile as a waste product.

(7) If desired, the phosphoric acid from step (5) above may be treated by one or another of several patented processes to recover uranium values using the "yellow cake" process.

(8) The sulfuric acid used in step (2) above, to digest the phosphate rock, is usually obtained from an intra-plant sulfuric acid plant. This may be a chamber process plant or the more common contact process plant, using a vanadium oxide catalyst. Such plants are of conventional and/or proprietary design and are not claimed in this invention. Most plants use sulfur dioxide from a convenient and economical source to form into sulfur trioxide to form into sulfuric acid. If a contact process plant is used, the catalyst is poisoned, or inhibited from functioning, by trace amounts of impurities such as chlorine, fluorine, and other elements. Therefore, in such plants it has been common practice to obtain sulfur dioxide gas by burning elemental, pure sulfur.

Prior to this invention there have been many attempts to devise processes to recover all or part of the economically recoverable products contained in the waste phospho-gypsum and to concurrently solve the waste disposal problem. In Europe and other parts of the world, the phospho-gypsum is disposed of by dumping in the open sea, with loss of all commercial value. In other areas, notably the United States, disposal must be in a storage pile or impounding basin. The leaching action of rainwater and/or storage water produces an acidic effluent that may enter the nearby surface and/or groundwater regime, creating an environmental hazard. Increasingly stringent regulations require the collection of the effluent waters, and neutralization. This is an expensive and non-productive process.

The technical literature of the last 40 years or more includes discussions of and patents for various methods for the commercial use of all or part of the constituents of phospho-gypsum. In Japan, the United Kingdom, and several other countries, where natural gypsum is in short supply, the phospho-gypsum has been economically converted to plaster products, such as Plaster of Paris, to gypsum wallboard, or as an additive to portland cement, acting as a set retarder. This is not economically feasible in places such as North America where natural gypsum abounds.

Various proposals have been made for conversion of phospho-gypsum to useful and economical products by chemical conversion. In every instance, although technically feasible, the cost of the chemicals to cause the conversion has been greater than the value of the resulting product. An example is the reaction of gypsum with ammonia and carbon dioxide to form ammonium sulfate and calcium carbonate. Because of its low purity compared to natural gypsum, and that the production of urea from the ammonia and carbon dioxide forms a higher value product, the use of phospho-gypsum has not proven economical in this manner.

It has also been recognized, in the technical literature, that the recovery of sulfur from phospho-gypsum, to form sulfuric acid, can be possible in certain instances, particularly in light of the increasing cost of recovery of natural sulfur by mining. This method involves calcination of the impure gypsum leaving a calcium silicate co-product. It has generally been concluded that this process is not completely technically and economically feasible because of the high cost of drying and calcining the gypsum, the corrosive effect of the hydrofluoric acid formed in the off gases and the detrimental presence of phosphorus in the calcium silicate. It is significant that almost all processes of this type utilize a rotary kiln as the drying-calcining-fusing device. That device is notoriously heat inefficient and does not provide a means for technically and economically recovering the sulfur, phosphorus, and/or the fluorine values. The present invention uses an electric furnace for the final, high temperature stage of fusion which liberates the remaining phosphorus and other values in a separate and inert or controlled atmosphere, permitting collection of the phosphorus and other vapors.

At no place in the existing technical literature is there a description or suggestion of a total process involving acid washing the phospho-gypsum waste product, calcining the washed product to re-cycle the sulfur values, and fusing the remaining product in an electric furnace to recover residual phosphorus and fluorine values, leaving a calcium silicate of commercial value for use in other manufacturing processes such as the refactory or rock wool insulation industries. This is the claim of the present invention.

SUMMARY OF THE INVENTION

The conventional phosphoric acid process produces an impure phospho-gypsum waste product that has had no commercial value and which is environmentally unacceptable. This invention provides an improvement in the process whereby the recovery of phosphorus and fluorine values is increased to almost 100%, the sulfur values are totally recovered and re-cycled, eliminating the need for an out-of-plant source for sulfur, and the remaining impure lime is recovered in a usable, commercially valuable form which can then be incorporated into other useful processes and/or products.

Conventional technology is used in mining, preparation, and grinding of phosphate rocks, which are ground in a weak phosphoric acid solution.

Sulfuric acid and the prepared phosphate rock are combined in digester tanks as is presently practiced. However, the sulfuric acid comes from the later step in the process, an acid bath of the phospho-gypsum, and contains some dissolved phosphorus and fluorine values that are added to the process at this point for normal removal, either in off-gases from the digester, off-gases from the concentrator, or in the product phosphoric acid.

The acid-gypsum slurry is filtered and the phosphoric acid is removed, concentrated, and stored for further use or sale.

In the improved process, the gypsum cake is flooded with fresh, concentrated sulfuric acid, with water as the dilutant, from the sulfuric acid source, either an intra-plant source or by purchase from out-of-plant. The sulfuric acid digests some of the phosphorous and fluorine values in the gypsum and is removed by filtering for use in the phosphate rock digester tanks.

The gypsum cake is washed with water, filtered to reduce the free water content, and combined with controlled amounts of silican and carbon, usually in the form of sand and coke.

The combined materials are fed to a drier-calciner device, usually a fluid bed reactor, where the temperature of the mix is raised to between 100° to 200° C., to remove all of the bound water, and then heated further to between 900° and 1300° C. depending on the amounts of silica and carbon added to dissociate the sulfur dioxide.

The heat in the reactor is provided by heat transfer from combustion gases from burning a fuel which may be high in sulfur content. The sulfur dioxide from the fuel combines with the other sulfur dioxide for further use.

The gas stream from dehydration, desulfurization, and combustion is cooled, cleaned, and then either converted to hydrogen sulfide or elemental sulfur for storage and sale, or is submitted directly to a sulfuric acid plant to regenerate the needed acid for the acid bath-digester system described above.

The remaining impure lime is fed directly into an electric furnace. To this is added the dust collected from the calcination reactor and any other inorganic materials desired in the molten bath. Vapors are collected and treated to remove sulfur dioxide, sulfur trioxide, fluorine, phosphorus, alkalies, and other useful and valuable products. The melt reaches a temperature of 1300° to 1650° C., depending upon the amount of inorganic materials added, where a uniform chemical constituency is reached. The molten product is then tapped, cooled, and stored for sale as one of several forms of calcium silicate(s), is formed into rock wool insulation, or is cooled and formed into products such as refractories or road aggregates.

After recovery of sulfur to regenerate sulfuric acid, recovery phosphorous and fluorine, and utilization of the impure lime in useful products, the only waste residue from the process is water vapor, carbon dioxide, nitrogen and oxygen gases from drying and combustion, which are vented to the atmosphere.

DESCRIPTION OF THE DRAWINGS

The accompanying drawing is a schematic diagram of the improved process for phosphoric acid manufacture with recovery of valuable co-products. The numbered steps in the drawing correspond with the numbered steps described in detail below.

DETAILED DESCRIPTION

Broadly speaking, the process of the present invention involves the complete utilization of natural phosphate rock in commercially valuable products, leaving only common, innocuous, and ubiquitous gases as a residue. The presently used wet-acid process for using phosphate rock to manufacture phosphoric acid leaves a waste residue of impure phospho-gypsum which is uneconomical and is environmentally repugnant and hazardous. The improvements in the process, claimed in this invention, include complete utilization of the waste phospho-gypsum, regenerating all sulfur values, increasing phosphorus and fluorine yield to nearly 100%, and recovering all calcium values as calcium silicates.

The improved process will work with all types of natural phosphate rock. A typical chemical analysis, for illustration, is that for a Florida Phosphate Rock of Commercial Grade 72 BPL. The rock will analyze about as follows:

| | | |
|---|---|---|
| Calcium Phosphate, $Ca_3(PO_4)_2$ | 72% | |
| Calcium Fluoride, $CaF_2$ | 8% | |
| Calcium Carbonate, $CaCO_3$ | 6.5% | |
| Calcium Sulfate, $CaSO_4$ | 2% | |
| Silicon Dioxide, $SiO_2$ | 6.5% | |
| Iron-Aluminum Oxides, $R_2O_3$ | 2% | |
| Water, $H_2O$ | 1% | |
| Organic Matter | 2% | |

The rock of typical composition, given above as an example, and using chemically correct combinations, will have approximately the following added material requirements and yield:

| | | |
|---|---|---|
| | Phosphate Rock, 72 BPL | 1.65 ton |
| and | Sulfuric Acid, 95% | 1.47 ton |
| and | Water | 0.31 ton |
| yields | Phosphoric Acid (75% $H_3PO_4$) | 1.00 ton |
| and | Hydrogen Fluoride (HF) | 0.07 ton |
| and | Waste Phospho-Gypsum (Dry) | 2.36 ton |

From this example, it may be seen that the waste product gypsum far exceeds the useful product acid in quantity.

Because the conventional process, and most commercial processes of similar type, do not yield 100% of the available products in the natural ore, the phospho-gypsum waste way contain some unreacted ore, perhaps as much as 3 to 5%. The completion of the recovery of calcium, fluorine, phosphorus, and other values is the objective of the second stage acid bath, and the final stage, the electric furnace fusion, of the present invention.

As shown in the typical materials analysis given above, the raw materials for phosphoric acid manufacture are phosphate rock, sulfuric acid, and water. The phosphate rock contains valuable elements consisting of phosphorus, fluorine, and calcium, all of which are recovered in the process of this invention. The impurities in the rock are mainly iron-aluminum-silica, all of which are combined with the calcium to form commercially valuable calcium silicates. The chemistry of the calcium silicates may be varied, over a restricted range, by the addition of desired and necessary ingredients, usually inorganic oxides, to the electric furnace during the fusion process. The dust from the calcining furnace and, if desired, the dried sludge from the phosphoric acid may also be added to the molten product in the electric furnace and thus incorporated into the final calcium silicate co-product(s).

The sulfuric acid used in the process may be regenerated from an in-house sulfuric acid plant or may be purchased and received from an out-of-plant source. Sulfur dioxide is the basic raw material for manufacture of sulfuric acid, whether by the contact process or the nearly obsolete chamber process. This invention makes no claim for improvement of any part of the sulfuric acid process. In the phosphoric acid plant, all of the sulfuric acid used reacts with the calcium of the phosphate rock to form calcium sulfate, although a small amount may be lost in the product acid or as residue with the waste gypsum.

It is possible within the process of this invention to establish a production cycle between the sulfuric acid, the phosphate rock, and the phospho-gypsum whereby the sulfur content is completely re-cycled, obviating the need for replenishment or disposal. If a high sulfur fossil fuel is used, then additional sulfur will enter the system in the form of sulfur dioxide. If an in-house sulfuric acid plant exists, the phosphoric acid manufacturer may choose to calcine part of his existing stockpile of waste phospho-gypsum, in addition to his daily production, to make sulfuric acid for sale or other applications. If out-of-plant sources are used, then the sulfur dioxide from the present invention, both from calcination and from combustion of fuel, may be processed to merchantable forms of sulfur, such as elemental sulfur or hydrogen sulfide, or sulfur dioxide or sulfur trioxide.

Heat energy for the entire process can be derived electrically or by burning any convenient fossil fuel including low cost high sulfur fuels. If combustion gases are used for heat transfer a high sulfur content fuel, which otherwise would be uneconomical to use elsewhere because of the evolution of high amounts of sulfur dioxide, would be most acceptable in this process and may even be sought after to provide additional sulfur value recovery in the sulfur-sulfuric acid plant making more low sulfur fuels available for useage elsewhere.

This improved process for phosphoric acid manufacture by the wet-acid process, with recovery of all co-products, follows a fairly conventional sequence through the acid filtration step. The steps in this process, summarized earlier in this document, and shown as corresponding numbered steps in the enclosed process flow diagram attached, are detailed as follows:

(1) Commercial benificiated phosphate rock is received at the phosphoric acid plant, and is charged to a grinder with a dilute solution of phosphoric acid. This solution is from a subsequent filtration step in the process, Step (8).

(2) The rock-acid slurry is passed to a digester tank where it reacts with sulfuric acid, diluted with phosphoric acid to produce a 55% strength sulfuric acid. The acid digestion usually requires 4 to 8 hours with constant agitation. The temperature is maintained at 75° to 80° C. to prevent partial dehydration of the gypsum that is formed. In some plants, a slightly higher temperature is used to form the calcium sulfate hemi-hydrate in a slightly more efficient process. The sulfuric acid for this step comes from a subsequent acid treatment step in the process, Step (7), and is an improvement over the conventional processes. Fluorine and phosphorus values recovered in the new subsequent step, and contained in the sulfuric acid, are now recovered in the general process at this point instead of being lost with the waste phospho-gypsum as is now the practice in the industry. Water vapor and other gases evolved in the digester are taken to an absorber where the fluorine values are removed and stored. The product in the digester is now phosphoric acid and impure phospho-gypsum.

(3) The phosphoric acid-gypsum slurry is passed through a filtration device, usually a vacuum filter, where most of the impure phosphoric acid is removed, leaving a phospho-gypsum residue, which exists as fine crystalline particles.

(4) Dissolved in the phosphoric acid filtrate are some iron, aluminum, calcium, and other compounds. Most of these compounds may be separated from the phosphoric acid as a sludge by precipitation and filtration. This sludge may be returned to the phospho-gypsum residue at Step (7) below to recover acid soluble values. The insoluble residue is then further processed, with the phospho-gypsum, through Steps (8) to (15) below to recover the remaining values.

(5) The phosphoric acid also contains a small amount of radioactive uranium. Several patented and/or proprietary processes exist for recovery of uranium values from phosphoric acid, usually by the "yellow cake" method. This part of the process is not claimed in this invention, however our process does not preclude its use.

(6) The phosphoric acid filtrate is evaporated to the desired concentration and used, in another process, or stored and sold. Fumes from the evaporators usually contain fluorine and phosphorus and these are recovered by conventional methods, not a claim of this invention.

(7) In the improved process of this invention, the phospho-gypsum filter residue from Step (3) above is flooded with fresh concentrated sulfuric acid. The sulfuric acid is that which is intended to be used in Step (2) above and comes from an in-house sulfuric acid plant or from an out-of-plant source. The slurry of acid and gypsum from Step (3), and sludge from Step (4) above, is agitated vigorously for at least 15 minutes, with temperature control as in Step (2) above. The objective of this step is to further digest unreacted phosphate rock and to dissolve residual phosphorus and fluorine remaining from the filtration of Steps (3) and (4) above. Fine silica may also be added to the slurry before agitation to assist in removal of fluorine values as silicon tetrafluoride. The sulfuric acid and dissolved matter are filtered using the same or similar vacuum filter as in Step (3) above and the filtrate is passed entirely to the digester tank of Step (2) above.

(8) The acid-saturated phospho-gypsum is water washed, in one or more steps as necessary, to remove all water soluble phosphorus and fluorine compounds remaining. The water from the first wash is passed to the rock grinder of Step (1) above. Water from the second and/or later washes, if necessary for fluorine removal, is passed to the sulfuric acid plant, if one is in-plant. All other water, if any, is passed to a wastewater treatment plant where the acidity is neutralized. The purpose of the water wash is to inhibit the formation of fluorine-water compounds in the later, drying step in the process.

(9) Carbon is now added to the resulting phospho-gypsum. The remaining unreacted silica added in Step (7) and the carbon are present to accelerate the calcination of the gypsum. The silica acts as a flux and lowers the decomposition temperature. The carbon, added in the amount of about 0.6 mole carbon to one mole of sulfate, reduces the calcium sulfate and forms lime, carbon dioxide, and sulfur dioxide at a reduced temperature and with much reduced heat of formation energy required. The silica will usually be in the form of a quartz sand and the carbon can be in the form of a low cost, high sulfur coal, or petroleum coke. A high sulfur content source is acceptable since the resulting sulfur dioxide is added to the gas stream, giving a higher sulfur dioxide yield. The moist phospho-gypsum, silica, and carbon are fed to a drier-calciner heating device where the temperature of the mixture is raised to between 900° and 1300° C. to cause dehydration of the gypsum and decomposition of the calcium sulfate into impure lime, sulfur dioxide gas, and carbon dioxide gas from the carbon reaction. The heating device may be indirect or direct, such as an electric furnace, or may be direct, using combustion gases for heat transfer to the materials. This kind of furnace is typefied by a rotary kiln, a traveling grate, or a fluidized bed unit. For the process of this invention, the fluid bed is preferred. Sufficient chambers for heat transfer are provided to permit virtually complete recuperation of the sensible heat in the combustion gases. The mixture must reach between 900° and 1300° C. to accomplish at least 97% desulfurization of the calcium sulfate.

(10) A fuel burner of conventional design is used to combust any convenient, low-cost fossil fuel, preferably high in sulfur content. The heat energy in the combustion gases is recovered and used in the process. The gases are passed to the gas treatment facility of Step (11) for removal and further use of the sulfur dioxide, contained in the gas, from the fuel. If the drier-calciner device used in Step (9) is an electric furnace, the hot combustion gases may be passed through the materials to add to the gas treatment in Step (11), or they may be used directly in an electric generating system to provide power for the electric furnace and then passed to gas treatment as in Step (11). If the drier-claciner of Step (9) is a device that uses direct heat transfer, the hot combustion gases from the fuel burner are directed into the materials in the device of Step (9), such as through a fluid bed unit, a rotary kiln, or other such device.

(11) The off gases from the drier-calciner furnace are reduced to a convenient temperature, particulate matter is removed by conventional dry methods such as a baghouse, cyclone and/or electrostatic precipitator and the gases are passed through a water or absorption treatment to remove the fluorine. The resulting sulfur dioxide containing gas stream is fed to a conventional gas treatment device where the sulfur dioxide and oxygen contents are modified, as necessary, to be fed directly to a sulfuric acid plant or to be reduced to hydrogen sulfide and/or elemental sulfur for storage and sale. The remaining gases, containing water vapor, carbon dioxide, nitrogen and oxygen, are vented to the atmosphere as the only waste from the process. This waste gas stream complies with all environmental regulations.

(12) The hot solids from the drier-calciner device, and the particulate matter recovered from the off-gas stream, are fed directly to an electric furnace where they are melted, or fused, at a temperature of about 1300° to 1650° C. Other materials may be added to the melt to effect economy of operation and/or to alter product chemistry to a necessary and desired combination. This may include the dried sludge from the phosphoric acid product following Step (4) above, and/or may consist of other minerals such as iron or aluminum oxides or more silicon dioxide. The electric furnace is a refractory lined container that is either fixed or may be tilted. The heat energy is provided by carbon electrodes or an electro-magnetic field. Thermal currents tend to cause complete mixing of the molten material in the furnace with all added materials, causing uniformity and homogeneity of the melt. Uniform and rapid chemical combinations occur in the furnace.

(13) The atmosphere above the melt may be as desired, from oxidizing to neutral to reducing to vacuum, dependent on the use of a cover, or roof, and/or the introduction of specific gases into or over the melt. All gases, both evolved and introduced, may be totally recovered in a roofed, or covered, furnace and fed to a gas treatment device. At the melt temperatures proposed, fluorine, phosphorus, alkalies, and other materials will evolve as gases, further permitting efficient recovery of valuable co-products and/or elimination of undesirable elements in the final mixture to be taken from the furnace. All of the gaseous products are removed from the off-gases by conventional methods and these are not claimed in this invention. Sulfur dioxide from previously unreacted sulfates is separated and added to the gas stream of Step (11) above.

(14) The molten product remaining in the electric furnace is rich in calcium oxide and contains silicon dioxide, some iron-aluminum oxides, and such other compounds as were present in the phospho-gypsum or purposely added to the melt. The melt is then tapped from the furnace, either by gravity through a tapping port in the side of the furnace or by tilting the entire furnace. The molten product is cooled, usually by an air stream which may be used as pre-heated air for combustion of the fossil fuel in the drier-calciner furnace or may be used in waste heat boilers or as a source of energy for other parts of the process.

(15) After cooling to a convenient temperature, near ambient, the co-product(s) is stored and later sold as calcium aluminum silicates, refractory materials, rock wool insulation, road aggregates, or other commercially valuable products, whose characteristics were defined by the chemistry of the melt and by the method of cooling and forming the product.

The process described above accomplishes several useful purposes because of the new novel and unique combination and sequence of steps. First, it increases the recovery of phosphorus and fluorine values from the normal efficiency to nearly 100%, improving operating economics of these valuable products by several percentage points. Second, the complete utilization of the presently wasted phospho-gypsum into a commercial product again improves plant economics; it also eliminates a waste product that is environmentally repugnant and hazardous. Third, the complete recovery and re-cycling of sulfur values eliminates the need for importation or mining of new sulfur for this process, saving the cost and energy required for its production and helps reduce the introduction of new sulfur into the environment. Fourth, the process energy may be provided by a high sulfur-content fuel which could not otherwise economically be used, permitting the world's supply of low sulfur fossil fuel energy for use in more demanding places. The air emissions from the process are cleaned of all sulfur and fluorine, leaving them environmentally acceptable.

This invention is intended to cover all changes and modifications of the example of the invention herein chosen for purposes of the disclosure which do not constitute departures from the spirit and scope of the invention.

What is claimed is:

1. A process for treating phospho-gypsum waste product produced the manufacture of phosphoric acid by the wet-acid process wherein phosphate rock is treated with sulfuric acid to produce said phospho-gypsum waste product, comprising:
    (a) treating phospho-gypsum waste product from the production of phosphoric acid with sulfuric acid,
    (b) calcining the acid treated phospho-gypsum product above about 900° to recover the sulfur dioxide values,
    (c) utilizing the recovered sulfur dioxide values to produce sulfuric acid used to treat the phospho-gypsum waste product in Step (b), and
    (d) treating the calcined phospho-gypsum waste product in an electric furnace to produce a melt containing calcium silicates and vapors containing recoverable sulfur dioxide values for use in producing sulfuric acid.

2. The process of claim 1 including the step of recovering any residual phosphorus and fluorine values.

3. The process of claim 1 including the step of recovering sulfuric acid used in treating the phospho-gypsum waste product and utilizing it to treat phosphate rock in the wet-acid process.

4. The process of claim 1 wherein the calcining is done in a fluidized bed reactor in the presence of silica and carbon.

5. The process of claim 4 wherein the acid treated waste product is calcined at a temperature of about 900° C. to about 1300° C.

6. The process of claim 1 wherein the heat for calcining is generated from hot combustion gases of high-sulfur fossil fuel.

7. The process of claim 2 wherein the vapors produced in the electric furnace are collected and treated to remove sulfur dioxide, phosphorus, and fluorine values.

8. The process of claim 1 wherein the melt in the electric furnace is heated to about 1300° C. to about 1650° C. and calcium silicate material is recovered after cooling.

* * * * *